United States Patent
Anspaugh et al.

(10) Patent No.: US 10,023,223 B2
(45) Date of Patent: Jul. 17, 2018

(54) STEERING COLUMN ASSEMBLY

(71) Applicant: Steering Solutions IP Holding Corporation, Saginaw, MI (US)

(72) Inventors: Michael P. Anspaugh, Bay City, MI (US); Donald A. Buzzard, Saginaw, MI (US); James C. Russell, Fairgrove, MI (US); Randy W. Jones, North Branch, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/281,640

(22) Filed: Sep. 30, 2016

(65) Prior Publication Data

US 2017/0349203 A1 Dec. 7, 2017

Related U.S. Application Data

(60) Provisional application No. 62/345,174, filed on Jun. 3, 2016.

(51) Int. Cl.
*B62D 1/19* (2006.01)
*B62D 1/184* (2006.01)

(52) U.S. Cl.
CPC .............. *B62D 1/195* (2013.01); *B62D 1/184* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,810,574 B1* | 11/2004 | Luthi | ...... | B21J 15/02 |
| | | | | 29/469.5 |
| 8,375,822 B2* | 2/2013 | Ridgway | ...... | B62D 1/184 |
| | | | | 280/775 |
| 8,978,510 B2* | 3/2015 | Buzzard | ...... | B62D 1/184 |
| | | | | 280/775 |
| 9,108,673 B2* | 8/2015 | Streng | ...... | B62D 1/184 |
| 9,399,481 B2* | 7/2016 | Oehri | ...... | B62D 1/184 |
| 9,428,215 B1* | 8/2016 | Nagatani | ...... | B62D 1/184 |
| 9,545,943 B2* | 1/2017 | Sakuda | ...... | B62D 1/185 |
| 9,586,610 B2* | 3/2017 | Figlioli | ...... | B62D 1/184 |
| 9,623,898 B2* | 4/2017 | Sakuda | ...... | B62D 1/195 |
| 9,764,757 B2* | 9/2017 | Buzzard | ...... | B62D 1/184 |
| 2007/0068310 A1* | 3/2007 | Arihara | ...... | B62D 1/184 |
| | | | | 74/493 |
| 2008/0141815 A1* | 6/2008 | Ridgway | ...... | B62D 1/183 |
| | | | | 74/493 |
| 2008/0191457 A1* | 8/2008 | Ridgway | ...... | B62D 1/184 |
| | | | | 280/775 |

(Continued)

FOREIGN PATENT DOCUMENTS

DE 102012101375 A1 * 8/2013 ............ B62D 1/184

*Primary Examiner* — Nicole T Verley
(74) *Attorney, Agent, or Firm* — Cantor Colburn LLP (57) ABSTRACT

A steering column assembly includes an energy absorption assembly, an adjustment lever, and a rocker member. The energy absorption assembly has an energy absorption strap and a cam member. The adjustment lever is operatively connected to at least one of the upper jacket assembly and the lower jacket assembly. The rocker member has a rocker member body that extends between a first end connected to the adjustment lever and a second end configured to engage the cam member.

19 Claims, 7 Drawing Sheets

(56) References Cited

U.S. PATENT DOCUMENTS

| | | | | |
|---|---|---|---|---|
| 2008/0236325 A1* | 10/2008 | Ridgway | ................ | B62D 1/184 74/493 |
| 2009/0267336 A1* | 10/2009 | Streng | .................... | B62D 1/184 280/775 |
| 2010/0300237 A1* | 12/2010 | Ridgway | ................ | B62D 1/184 74/493 |
| 2010/0300238 A1* | 12/2010 | Ridgway | ................ | B62D 1/184 74/493 |
| 2011/0185839 A1* | 8/2011 | Inoue | .................... | B62D 1/184 74/493 |
| 2013/0205935 A1* | 8/2013 | Buzzard | ................ | B62D 1/184 74/495 |
| 2014/0260758 A1* | 9/2014 | Buzzard | ................ | B62D 1/184 74/493 |
| 2014/0260762 A1* | 9/2014 | Streng | ................ | B62D 1/195 74/493 |
| 2015/0375770 A1* | 12/2015 | Buzzard | ................ | B62D 1/184 74/493 |
| 2016/0144883 A1* | 5/2016 | Vermeersch | ........... | B62D 1/184 74/89.14 |

* cited by examiner

STEERING COLUMN ASSEMBLY

CROSS-REFERENCES TO RELATED APPLICATIONS

This patent application claims priority to U.S. Provisional Patent Application Ser. No. 62/345,174, filed Jun. 3, 2016 which is incorporated herein by reference in its entirety.

BACKGROUND OF THE INVENTION

Some vehicles are provided with a telescopically adjustable steering column assembly. Vehicle packaging and functional design constraints may present challenges to efficiently and/or consistently releasing an energy absorption strap to enable a telescope adjustment of the steering column assembly.

SUMMARY OF THE INVENTION

According to an embodiment of the present disclosure, a steering column assembly is provided. The steering column assembly includes a lower jacket assembly, an upper jacket assembly, an energy absorption assembly, an adjustment lever, and a rocker member. The upper jacket assembly is at least partially received within the lower jacket assembly. The energy absorption assembly has an energy absorption strap connected to the lower jacket assembly and is selectively connected to the upper jacket assembly by a cam member pivotally connected to the lower jacket assembly. The adjustment lever is operatively connected to at least one of the upper jacket assembly and the lower jacket assembly. The adjustment lever being movable between a first position and a second position. The rocker member has a first end connected to the adjustment lever and a second end configured to engage the cam member.

According to another embodiment of the present disclosure, a steering column assembly is provided. The steering column assembly includes an energy absorption assembly, an adjustment lever, and a rocker member. The energy absorption assembly has an energy absorption strap connected to a lower jacket assembly and is selectively connected to an upper jacket assembly by a cam member. The adjustment lever is operatively connected to at least one of the upper jacket assembly and the lower jacket assembly. The adjustment lever is movable between a first position and a second position. The rocker member has a rocker member body that extends between a first end connected to the adjustment lever and a second end configured to engage the cam member.

According to yet another embodiment of the present disclosure, a steering column assembly is provided. The steering column assembly includes a lower jacket assembly, a bracket, a cam member, an energy absorption strap, an adjustment lever, and a rocker member. The lower jacket assembly is configured to slidably receive an upper jacket assembly. The bracket is disposed on the lower jacket assembly. The cam member is pivotally connected to the bracket by a pin that extends through the bracket. The energy absorption strap has a first portion connected to the lower jacket assembly and a second portion that is selectively connected to the upper jacket assembly by the cam member. The adjustment lever is connected to at least one of the upper jacket assembly and the lower jacket assembly. The adjustment lever is movable between a first position and a second position. The rocker member has a rocker member body extending between a first end and a second end. The first end has a post that operatively connects the first end to the adjustment lever. The second end is configured to engage the cam member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-5, a first illustrative embodiment of a steering column assembly 10 is shown. The steering column assembly 10 extends along a steering column axis 12. The steering column assembly 10 is configured as an adjustable telescopic steering column assembly wherein at least a portion of the steering column assembly 10 is configured to translate along the steering column axis 12. The steering column assembly 10 includes a lower jacket assembly 20, an upper jacket assembly 22, an energy absorption strap assembly 24, an adjustment lever 26, and a rocker member 28.

The lower jacket assembly 20 is connected to a vehicle through a mounting bracket 34. The mounting bracket 34 defines an opening 36 that provides access to at least a portion of the lower jacket assembly 20. The lower jacket assembly 20 is configured to at least partially receive the upper jacket assembly 22. The upper jacket assembly 22 is translatable along the steering column axis 12 to telescopically adjust a position of a steering wheel coupled to the upper jacket assembly 22.

The energy absorption strap assembly 24 interfaces with the lower jacket assembly 20 and the upper jacket assembly 22. The energy absorption strap assembly 24 is configured to provide a drag load or force opposing stroking or translation of the upper jacket assembly 22 relative to the lower jacket assembly 20 along the steering column axis 12 to decelerate the steering column assembly during a steering column collapse event. The drag load or force opposing stroking or translation of the upper jacket assembly 22 relative to the lower jacket assembly 20 along the steering column axis 12 may be adjustable based on the configuration of the energy absorption strap assembly 24.

The energy absorption strap assembly 24 includes a bracket 40, an energy absorption strap 42, a cam member 44, and a pin 46. The bracket 40 extends from the lower jacket assembly 20 and is at least partially received within the opening 36 of the mounting bracket 34. In at least one embodiment, the bracket 40 is a separate component that is disposed on the lower jacket assembly 20. The bracket 40 includes a first bracket arm 50 and a second bracket arm 52 disposed opposite the first bracket arm 50.

The energy absorption strap 42 extends between the lower jacket assembly 20 and the upper jacket assembly 22. The energy absorption strap 42 is connected to the upper jacket assembly 22 and is selectively coupled to the lower jacket assembly 20 by the cam member 44. The energy absorption strap 42 is at least partially disposed between the first bracket arm 50 and the second bracket arm 52 of the bracket 40 of the lower jacket assembly 20. The energy absorption strap 42 includes a plurality of engagement members that face towards the cam member 44.

The cam member 44 is disposed between the first bracket arm 50 and the second bracket arm 52 of the bracket 40. The cam member 44 is pivotally connected to the bracket 40 of the lower jacket assembly 20 by the pin 46. The pin 46 extends completely through the bracket 40 and the cam member 44. A portion of the pin 46 extends beyond at least one of the first bracket arm 50 and a second bracket arm 52.

Engagement between the plurality of engagement members of the energy absorption strap 42 and the complementary engagement members of the cam member 44 inhibits telescope adjustment of the steering column assembly 10. The plurality of complementary engagement members of the cam member 44 are configured to selectively engage the plurality of engagement members of the energy absorption strap 42 based on a position of the adjustment lever 26 and a position of the rocker member 28.

The adjustment lever 26 is connected to at least one of the lower jacket assembly 20, the upper jacket assembly 22, and the mounting bracket 34. The adjustment lever 26 is movably connected to at least one of the lower jacket assembly 20, the upper jacket assembly 22, and the mounting bracket 34 by a clamp bolt 60 that extends through the lower jacket assembly 20, the upper jacket assembly 22, and the mounting bracket 34. The adjustment lever 26 is configured to pivot, rotate, slide, or otherwise move, about or relative to the clamp bolt 60. The adjustment lever 26 is movable between a first position and a second position by an operator of the vehicle.

Figure 1:
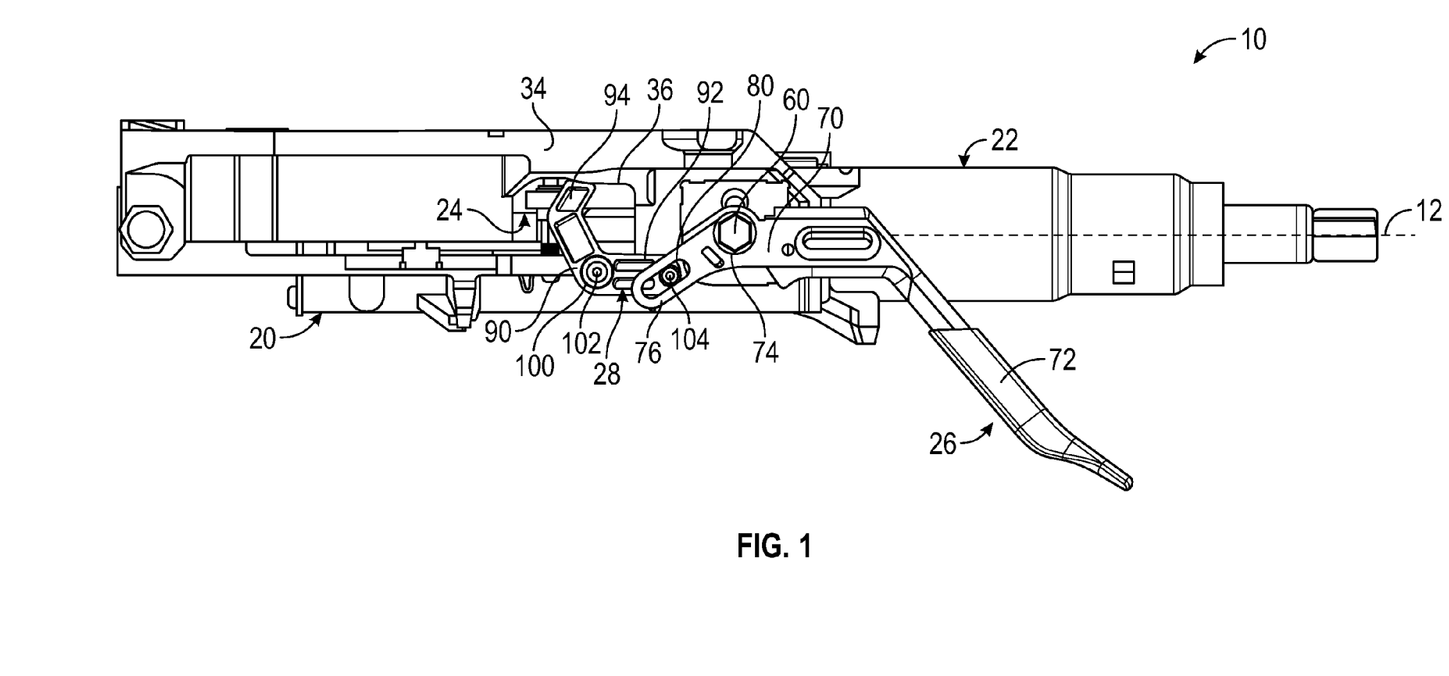
FIG. 1 is a side perspective view of a steering column assembly according to a first illustrative embodiment.
Figure 2:
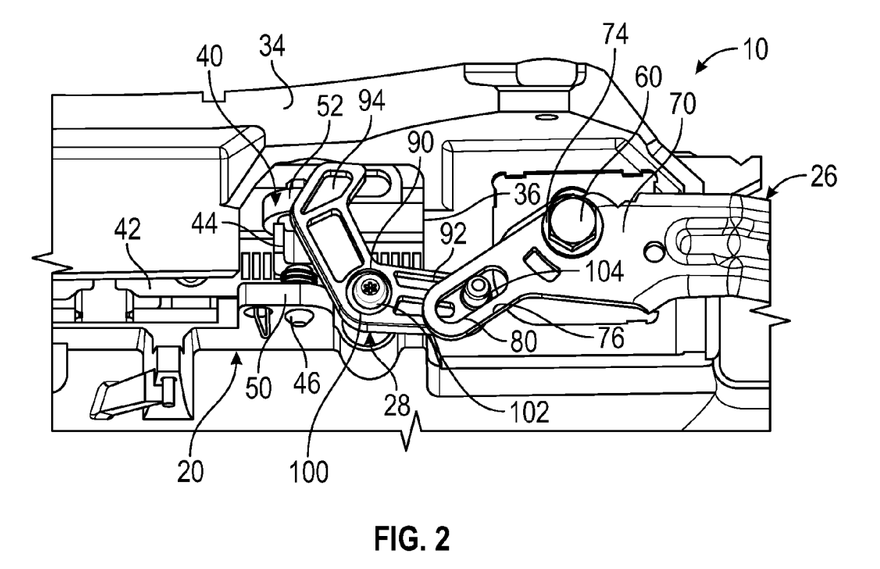
FIG. 2 is a partial side perspective view of the steering column assembly in a lock position.
Figure 3:
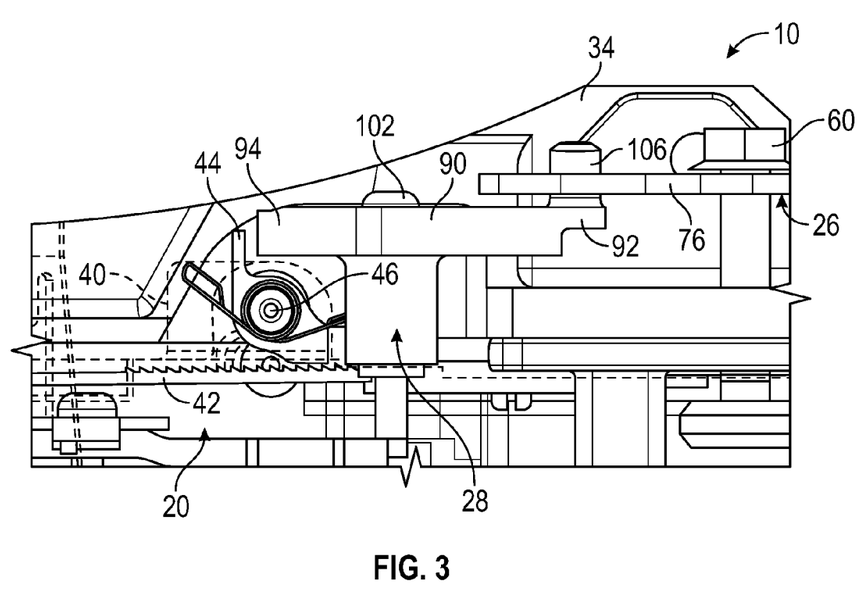
FIG. 3 is a partial bottom perspective view of the steering column assembly in the lock position.
Figure 4:
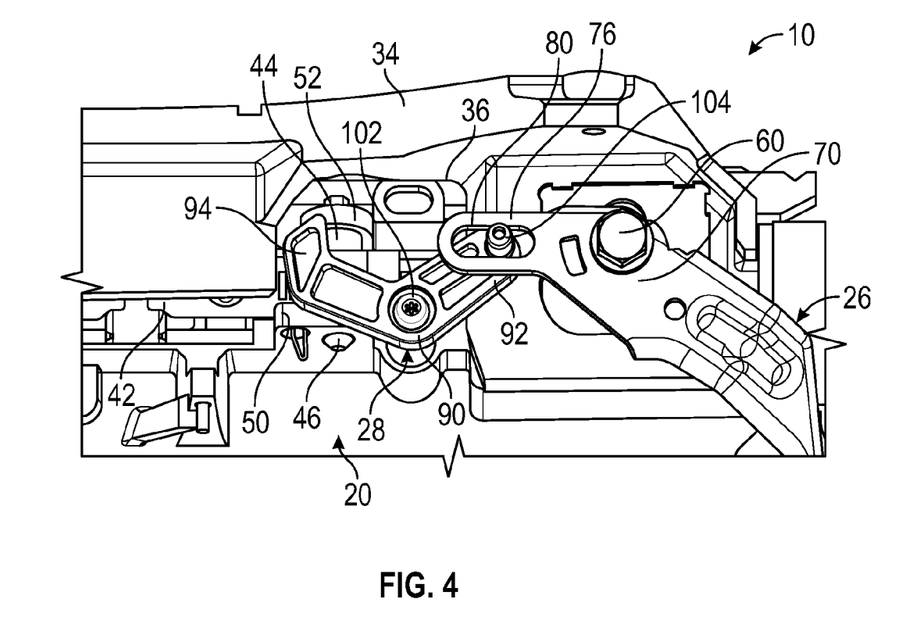
FIG. 4 is a partial side perspective view of the steering column assembly in an unlock position.
Figure 5:
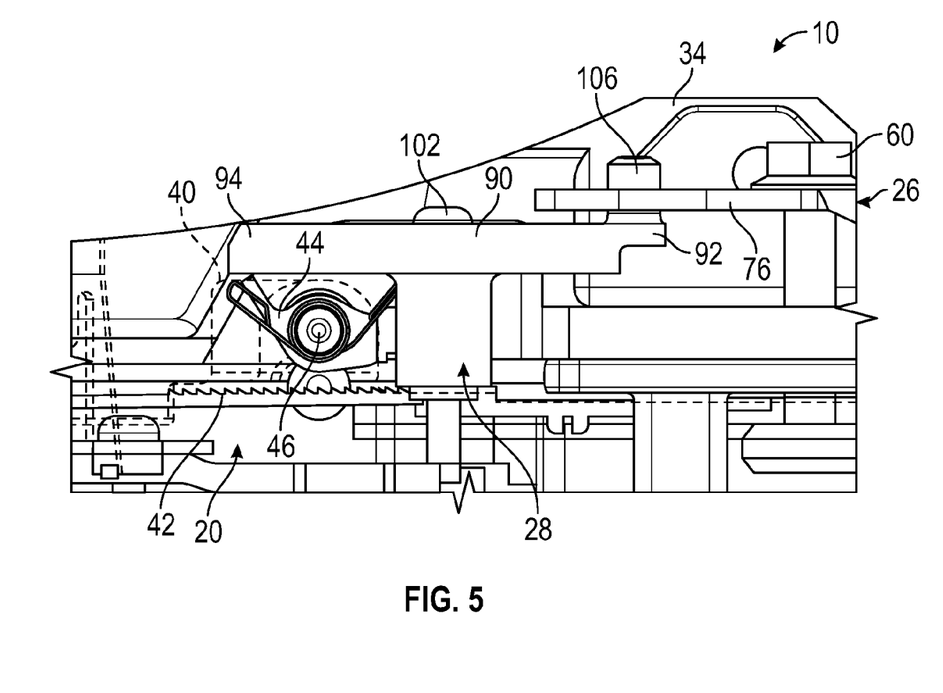
FIG. 5 is a partial bottom perspective view of the steering column assembly in the unlock position.

The first position of the adjustment lever 26 corresponds to a lock position of the adjustment lever 26 that inhibits telescope adjustment of the upper jacket assembly 22 relative to the lower jacket assembly 20 (see FIGS. 1-3). The first position or the lock position of the adjustment lever 26 maintains the steering wheel connected to the upper jacket assembly 22 in a position stable for driving. The second position of the adjustment lever 26 corresponds to an unlock position of the adjustment lever 26 that facilitates telescope adjustment of the upper jacket assembly 22 relative to the lower jacket assembly 20 (see FIGS. 4-5).

The adjustment lever 26 includes a lever body 70 and a handle 72. The lever body 70 defines a mounting opening 74 and an extension member 76. The mounting opening 74 is configured to receive the clamp bolt 60 to connect the adjustment lever 26 to at least one of the lower jacket assembly 20, the upper jacket assembly 22, and the mounting bracket 34. The extension member 76 extends towards the energy absorption strap assembly 24 and/or an end of the lower jacket assembly 20 that is disposed opposite the steering wheel that is operatively connected to the upper jacket assembly 22. The extension member 76 defines a drive slot 80.

The handle 72 extends from the lever body 70. The handle 72 is disposed opposite the extension member 76 and extends towards the steering wheel that is operatively connected to the upper jacket assembly 22.

The adjustment lever 26 is spaced apart from the cam member 44 of the energy absorption strap assembly 24. The rocker member 28 extends between the adjustment lever 26 and the cam member 44 to actuate the cam member 44 to enable or facilitate telescope adjustment of the upper jacket assembly 22 relative to the lower jacket assembly 20. The rocker member 28 is configured to pivot the cam member 44 to release the complementary engagement members of the cam member 44 from engagement with the plurality of engagement members of the energy absorption strap 42.

The rocker member 28 includes a rocker member body 90 extending between a rocker member first end 92 and a rocker member second end 94. The rocker member body 90 defines a body opening 100 that is configured to receive a fastener 102 to pivotally connect the rocker member 28 to the lower jacket assembly 20 or the mounting bracket 34.

The rocker member first end 92 defines or includes a post 104. The post 104 extends from the rocker member first end 92 and is received within the drive slot 80 of the extension member 76 of the adjustment lever 26 to connect the rocker member first end 92 to the adjustment lever 26.

The rocker member second end 94 is configured to selectively engage the cam member 44. The rocker member first end 92 and the rocker member second end 94 extend away from each other at an angle with respect to each other. The angle may be an obtuse angle and may be configured such that the rocker member first end 92 and the rocker member second end 94 extend generally in opposite directions and generally upward or away from the body opening 100.

The rocker member 28 is pivotable between a lock position and an unlock position. The rocker member 28 is in the lock position while the adjustment lever 26 is in or moves towards the first position. The rocker member second end 94 is spaced apart from and does not engage the cam member 44 while the rocker member 28 is in the lock position (see FIGS. 1-3). The rocker member 28 is in the unlock position while the adjustment lever 26 is in or moves towards the second position. The rocker member second end 94 engages the cam member 44 while the rocker member 28 is in the unlock position to pivot the cam member 44 to selectively disconnect the energy absorption strap 42 from at least one of the lower jacket assembly 20 and upper jacket assembly 22 (see FIGS. 4-5).

Figure 6:
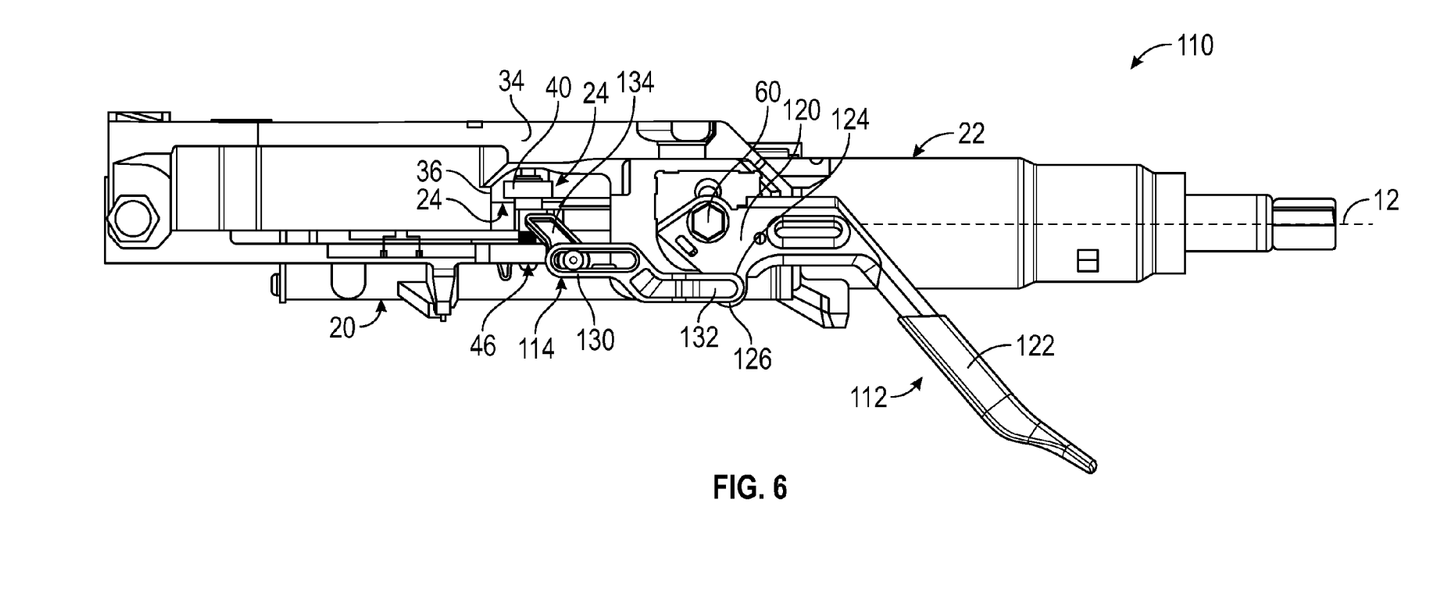
FIG. 6 is a side perspective view of a steering column assembly according to a second illustrative embodiment.
Figure 7:
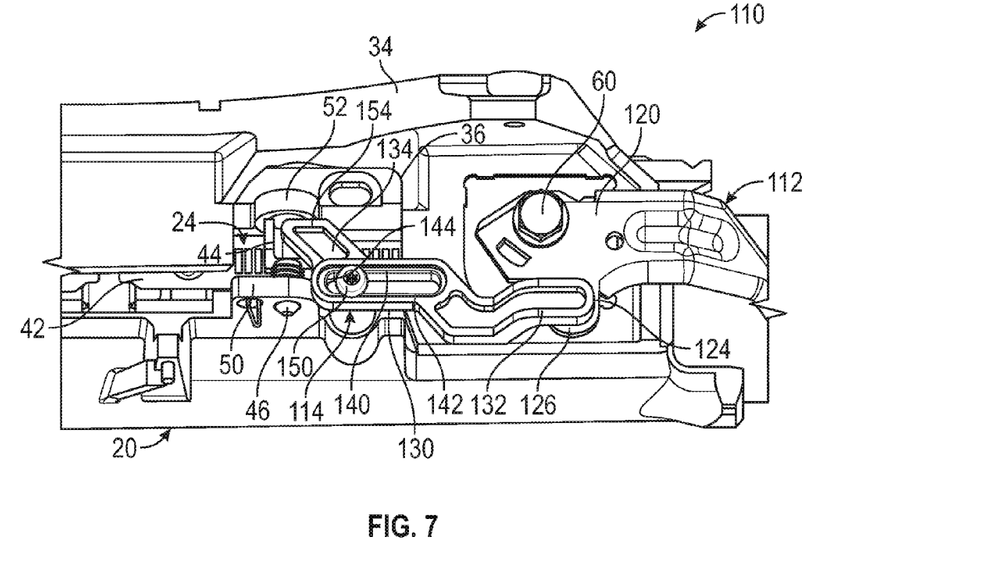
FIG. 7 is a side perspective view of the steering column assembly in a lock position.
Figure 8:
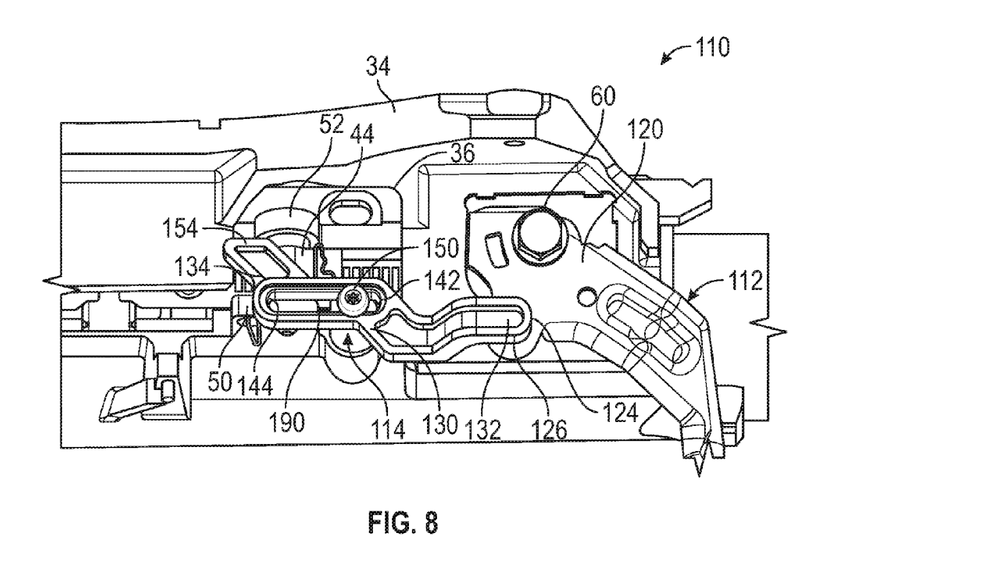
FIG. 8 is a side perspective view of the steering column assembly in an unlock position.

Referring to FIGS. 6-8, a second illustrative embodiment of a steering column assembly 110 is shown. The steering column assembly 110 has a substantially similar configuration as the first illustrative embodiment of the steering column assembly. As such, similar components are given are given similar or the reference numbers between the illustrative embodiments. The second illustrative embodiment of the steering column assembly 110 includes a lower jacket assembly 20, an upper jacket assembly 22, an energy absorption strap assembly 24, an adjustment lever 112, and a rocker member 114.

The adjustment lever 112 is connected to at least one of the lower jacket assembly 20, the upper jacket assembly 22, and the mounting bracket 34. The adjustment lever 112 is movably connected to at least one of the lower jacket assembly 20, the upper jacket assembly 22, and the mounting bracket 34 by the clamp bolt 60 that extends through the lower jacket assembly 20, the upper jacket assembly 22, and the mounting bracket 34. The adjustment lever 112 is configured to pivot, rotate, slide, or otherwise move, about or relative to the clamp bolt 60. The adjustment lever 112 is movable between a first position and a second position by an operator of the vehicle.

The first position of the adjustment lever 112 corresponds to a lock position of the adjustment lever 112 that inhibits telescope adjustment of the upper jacket assembly 22 relative to the lower jacket assembly 20 (see FIGS. 6-7). The first position or the lock position of the adjustment lever 112 maintains the steering wheel connected to the upper jacket assembly 22 in a position stable for driving. The second position of the adjustment lever 112 corresponds to an unlock position of the adjustment lever 112 that facilitates telescope adjustment of the upper jacket assembly 22 relative to the lower jacket assembly 20 (see FIG. 7).

The adjustment lever 112 includes a lever body 120 and a handle 122. The lever body 120 defines a mounting opening 74 and an extension tab 124. The mounting opening 74 is configured to receive the clamp bolt 60 to connect the adjustment lever 112 to at least one of the lower jacket assembly 20, the upper jacket assembly 22, and the mounting bracket 34. The extension tab 124 defines an opening 126.

The handle 122 extends from the lever body 120. The handle 122 is disposed generally parallel to the extension tab 124 and is disposed substantially perpendicular to the steering column axis 12.

The adjustment lever 112 is spaced apart from the cam member 44 of the energy absorption strap assembly 24. The rocker member 114 extends between the adjustment lever 112 and the cam member 44 to actuate the cam member 44 to enable or facilitate telescope adjustment of the upper jacket assembly 22 relative to the lower jacket assembly 20. The rocker member 114 is configured to pivot the cam member 44 to release the complementary engagement members of the cam member 44 from engagement with the plurality of engagement members of the energy absorption strap 42.

The rocker member 114 includes a rocker member body 130 extending between a rocker member first end 132 and a rocker member second end 134. The rocker member body 130 defines a generally elongate slot 140. The generally elongate slot 140 has a first slot end 142 that is disposed proximate the rocker member first end 132 and has a second slot end 144 that is disposed proximate the rocker member second end 134. The generally elongate slot 140 is configured to receive a fastener 150 to slidably connect the rocker member 114 to the lower jacket assembly 20 or the mounting bracket 34.

The rocker member first end 132 is disposed substantially parallel to but not coplanar with the rocker member body 130. The rocker member first end 132 defines or includes a post 152. The post 152 extends from the rocker member first end 132 and is received within the opening 126 of the extension tab 124 of the adjustment lever 112 to connect the rocker member first end 132 to the adjustment lever 112.

The rocker member second end 134 is configured to selectively engage the cam member 44. The rocker member second end 134 defines a finger 154 that extends towards the cam member 44.

The rocker member 114 is slidable between a lock position and an unlock position. The rocker member 114 is in the lock position while the adjustment lever 112 is in or moves towards the first position. The fastener 150 is disposed proximate the second slot end 144 of the generally elongate slot 140 while the rocker member 114 is in the lock position. The finger 154 of the rocker member second end 134 is spaced apart from and does not engage the cam member 44 while the rocker member 114 is in the lock position (see FIGS. 6-7). The rocker member 114 is in the unlock position while the adjustment lever 112 is in or moves towards the second position. The fastener 150 is disposed proximate the first slot end 142 of the generally elongate slot 140 while the rocker member 114 is in the unlock position. The rocker member second end 134 engages the cam member 44 while the rocker member 114 is in the unlock position to pivot the cam member 44 to selectively disconnect the energy absorption strap 42 from at least one of the lower jacket assembly 20 and the upper jacket assembly 22 (see FIG. 8).

Figure 9:
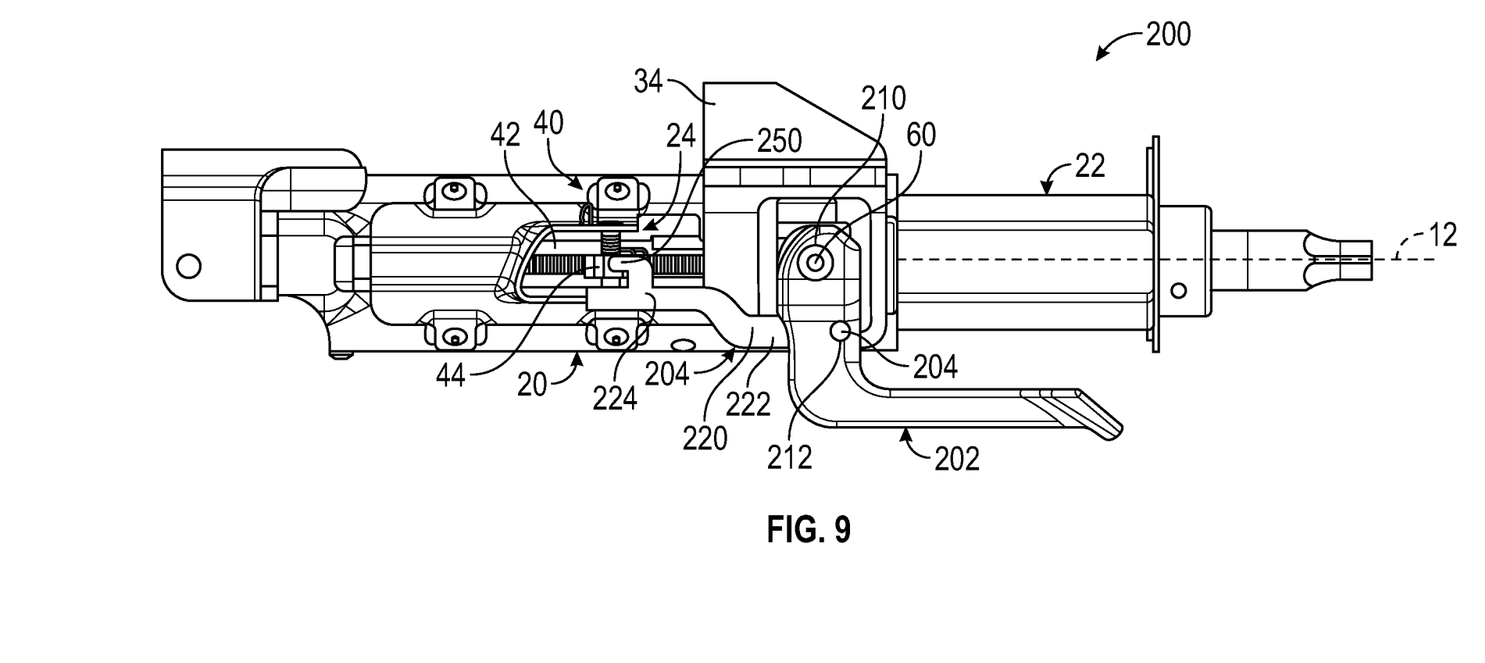
FIG. 9 is a side perspective view of a steering column assembly according to a third illustrative embodiment.
Figure 10:
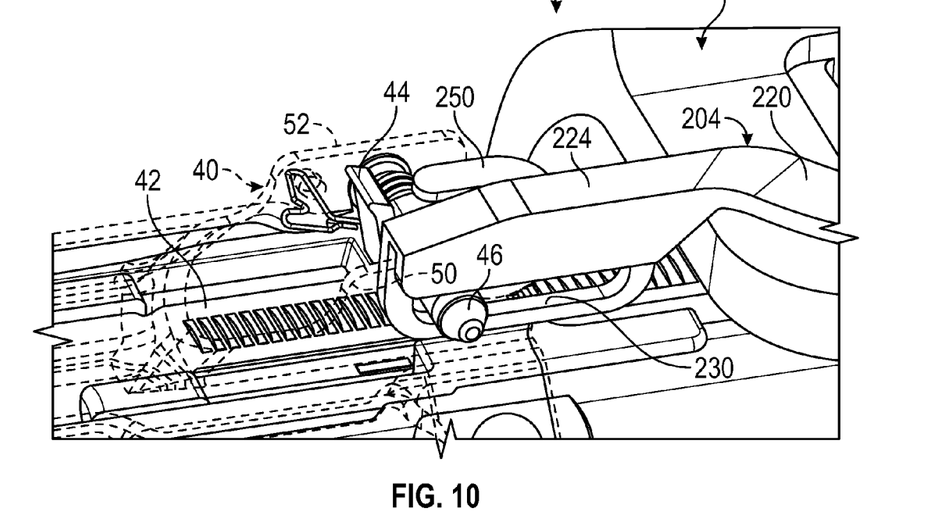
FIG. 10 is a bottom perspective view of the steering column assembly in a lock position.
Figure 11:
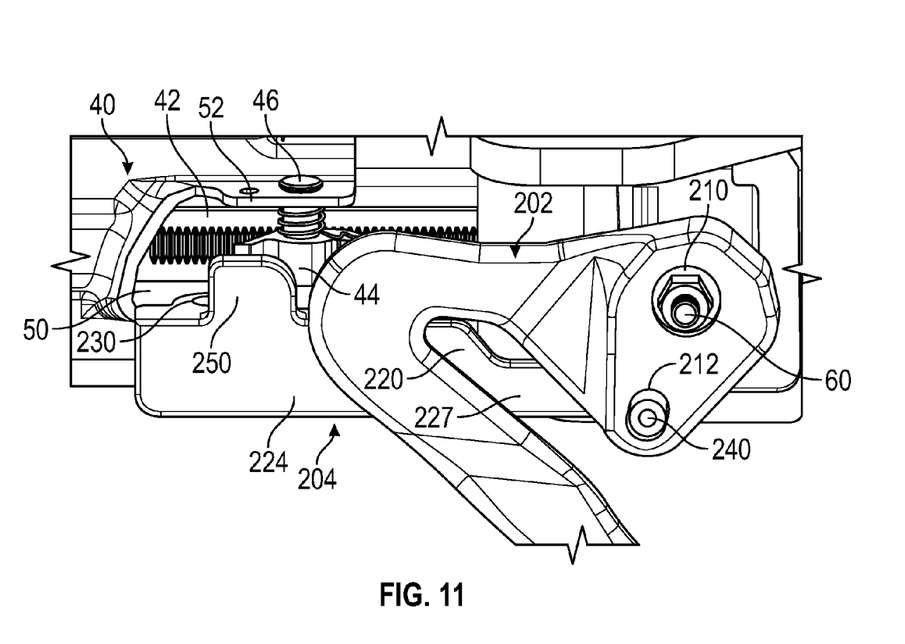
FIG. 11 is a side perspective view of the steering column assembly in an unlock position.

Referring to FIGS. 9-11, a third illustrative embodiment of a steering column assembly 200 is shown. The steering column assembly 200 has a substantially similar configuration as the first illustrative embodiment of the steering column assembly. As such, similar components are given are given similar or the same reference numbers between the illustrative embodiments. The third illustrative embodiment of the steering column assembly 200 includes a lower jacket assembly 20, an upper jacket assembly 22, an energy absorption strap assembly 24, an adjustment lever 202, and a rocker member 204.

The adjustment lever 202 is connected to at least one of the lower jacket assembly 20, the upper jacket assembly 22, and the mounting bracket 34. The adjustment lever 202 is movably connected to at least one of the lower jacket assembly 20, the upper jacket assembly 22, and the mounting bracket 34 by the clamp bolt 60 that extends through the lower jacket assembly 20, the upper jacket assembly 22, and the mounting bracket 34. The adjustment lever 202 is configured to pivot, rotate, slide, or otherwise move, about or relative to the clamp bolt 60. The adjustment lever 202 is movable between a first position and a second position by an operator of the vehicle.

The first position of the adjustment lever 202 corresponds to a lock position of the adjustment lever 112 that inhibits telescope adjustment of the upper jacket assembly 22 relative to the lower jacket assembly 20 (see FIGS. 9-10). The first position or the lock position of the adjustment lever 202 maintains the steering wheel connected to the upper jacket assembly 22 in a position stable for driving. The second position of the adjustment lever 202 corresponds to an unlock position of the adjustment lever 202 that facilitates telescope adjustment of the upper jacket assembly 22 relative to the lower jacket assembly 20 (see FIG. 11).

The adjustment lever 202 defines a mounting opening 210 and an opening 212. The mounting opening 210 is configured to receive the clamp bolt 60 to connect the adjustment lever 202 to at least one of the lower jacket assembly 20, the upper jacket assembly 22, and the mounting bracket 34. The opening 212 is spaced apart from the mounting opening 210.

The adjustment lever 202 is spaced apart from the cam member 44 of the energy absorption strap assembly 24. The rocker member 204 extends between the adjustment lever 202 and the cam member 44 to actuate the cam member 44 to enable or facilitate telescope adjustment of the upper jacket assembly 22 relative to the lower jacket assembly 20. The rocker member 204 is configured to pivot the cam member 44 to release the complementary engagement members of the cam member 44 from engagement with the plurality of engagement members of the energy absorption strap 42.

The rocker member 204 includes a rocker member body 220 extending between a rocker member first end 222 and a rocker member second end 224. The rocker member body 220 defines a generally elongate slot 230. The generally elongate slot 230 is disposed proximate the rocker member second end 224. The generally elongate slot 230 is configured to receive at least a portion of the pin 46 that pivotally connects the cam member 44 to the lower jacket assembly 20 to slidably connect the rocker member 204 to the lower jacket assembly 20.

The rocker member first end 222 is disposed substantially parallel to but not coplanar with the rocker member body 220. The rocker member first end 222 defines or includes a post 240. The post 240 extends from the rocker member first end 222 and is received within the opening 212 of the adjustment lever 202 to connect the rocker member first end 222 to the adjustment lever 202.

The rocker member second end 224 is configured to selectively engage the cam member 44. The rocker member second end 224 is disposed substantially parallel to but not coplanar with the rocker member first end 222. The rocker member second end 224 defines a tab 250 that extends towards the cam member 44.

The rocker member 204 is slidable between a lock position and an unlock position. The rocker member 204 is in the lock position while the adjustment lever 202 is in or moves towards the first position. The tab 250 of the rocker member second end 224 is spaced apart from and does not engage the cam member 44 while the rocker member 204 is in the lock position (see FIGS. 9-10).

The rocker member 204 is in the unlock position while the adjustment lever 202 is in or moves towards the second position. The tab 250 of the rocker member second end 224 engages the cam member 44 while the rocker member 204 is in the unlock position to pivot the cam member 44 to selectively disconnect the energy absorption strap 42 from at least one of the lower jacket assembly 20 and the upper jacket assembly 22 (see FIG. 11).

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments or combinations of the described embodiments. Accordingly, the invention is not to be seen as limited by the foregoing description.

Having thus described the invention, it is claimed:

1. A steering column assembly, comprising:
   a lower jacket assembly;
   an upper jacket assembly at least partially received within the lower jacket assembly;
   an energy absorption assembly having an energy absorption strap connected to the lower jacket assembly and is selectively connected to the upper jacket assembly by a cam member pivotally connected to the lower jacket assembly;
   an adjustment lever operatively connected to at least one of the upper jacket assembly and the lower jacket assembly, the adjustment lever being movable between a first position and a second position, the adjustment lever having an extension tab defining an opening; and
   a rocker member having a first end defining a post that is received within the opening of the extension tab and a second end configured to engage the cam member.

2. The steering column assembly of claim 1, wherein the adjustment lever includes an extension member defining a drive slot.

3. The steering column assembly of claim 2, wherein the rocker member first end includes a post that is at least partially received within the drive slot.

4. The steering column assembly of claim 3, wherein the rocker member is pivotally connected to the lower jacket assembly.

5. The steering column assembly of claim 1, wherein the rocker member is pivotable between a lock position in which the second end is spaced apart from the cam member and an unlock position in which the second end engages the cam member to selectively disconnect the energy absorption strap from the upper jacket assembly.

6. The steering column assembly of claim 5, wherein while the adjustment lever is in the first position, the rocker member is in the lock position.

7. The steering column assembly of claim 6, wherein while the adjustment lever is in the second position, the rocker member is in the unlock position.

8. A steering column assembly, comprising:
   an energy absorption assembly having an energy absorption strap connected to a lower jacket assembly and is selectively connected to an upper jacket assembly by a cam member;
   an adjustment lever operatively connected to at least one of the upper jacket assembly and the lower jacket assembly, the adjustment lever being movable between a first position and a second position; and
   a rocker member having a rocker member body extending between a first end connected to the adjustment lever and a second end defining a finger that extends towards and is configured to engage the cam member.

9. The steering column assembly of claim 8, wherein the rocker member body defines a generally elongate slot that is configured to receive a fastener to slidably connect the rocker member to the lower jacket assembly.

10. The steering column assembly of claim 9, wherein the rocker member is slidable between a lock position in which the second end is spaced apart from the cam member and an unlock position in which the second end engages the cam member to selectively disconnect the energy absorption strap from the upper jacket assembly.

11. The steering column assembly of claim 10, wherein while the adjustment lever is in the second position, the rocker member is in the unlock position.

12. The steering column assembly of claim 11, wherein while the rocker member is in the unlock position, the fastener is disposed proximate an elongate slot first end.

13. The steering column assembly of claim 12, wherein while the adjustment lever is in the first position, the rocker member is in the lock position.

14. The steering column assembly of claim 13, wherein while the rocker member is in the lock position, the fastener is disposed proximate an elongate slot second end.

15. A steering column assembly, comprising:
- a lower jacket assembly configured to slidably receive an upper jacket assembly;
- a bracket disposed on the lower jacket assembly;
- a cam member pivotally connected to the bracket by a pin that extends through the bracket;
- an energy absorption strap having a first portion connected to the lower jacket assembly and a second portion selectively connected to the upper jacket assembly by the cam member;
- an adjustment lever connected to at least one of the upper jacket assembly and the lower jacket assembly, the adjustment lever being movable between a first position and a second position; and
- a rocker member having a rocker member body extending between a first end and a second end, the first end having a post that operatively connects the first end to the adjustment lever and the second end defining a finger that extends towards and is configured to engage the cam member.

16. The steering column assembly of claim 15, wherein the rocker member body defines an elongate slot disposed proximate the second end.

17. The steering column assembly of claim 16, wherein the pin is at least partially received within the elongate slot.

18. The steering column assembly of claim 17, wherein the rocker member is movable between a lock position in which the second end is spaced apart from the cam member and an unlock position in which the second end engages the cam member to selectively disconnect the energy absorption strap from the upper jacket assembly.

19. The steering column assembly of claim 18, wherein the first end is disposed parallel to but not coplanar with the second end.

* * * * *